United States Patent [19]

Dehnert et al.

[11] 4,424,154
[45] Jan. 3, 1984

[54] AZO DYE HAVING A 3-CYANO- OR 3-CARBAMOYL-2,6-DIAMINOPYRIDINE COUPLING COMPONENT

[75] Inventors: Johannes Dehnert, Ludwigshafen; Hermann Löffler, Speyer; Gunther Lamm, Hassloch, all of Fed. Rep. of Germany

[73] Assignee: BASF Aktiengesellschaft, Rheinland-Pfalz, Fed. Rep. of Germany

[21] Appl. No.: 50,866

[22] Filed: Jun. 21, 1979

[30] Foreign Application Priority Data

Jul. 21, 1978 [DE] Fed. Rep. of Germany ....... 2832020

[51] Int. Cl.³ ................. C09B 31/153; D06P 1/04; D06P 1/16; D06P 3/54
[52] U.S. Cl. .................... 260/156; 260/205; 260/206; 260/207; 260/207.1
[58] Field of Search ......................... 260/156

[56] References Cited

U.S. PATENT DOCUMENTS

| | | | |
|---|---|---|---|
| 3,907,769 | 9/1975 | Dehnert et al. | 260/156 |
| 3,998,802 | 12/1976 | Dehnert et al. | 260/156 |
| 4,016,152 | 4/1977 | Dehnert et al. | 260/156 |
| 4,042,578 | 8/1977 | Dehnert et al. | 260/156 |
| 4,128,545 | 12/1978 | Dehnert et al. | 260/156 |
| 4,146,535 | 3/1979 | Dehnert et al. | 260/156 |

*Primary Examiner*—Floyd D. Higel
*Attorney, Agent, or Firm*—Oblon, Fisher, Spivak, McClelland & Maier

[57] ABSTRACT

A disazo dye derived from a pyridine coupling component and having the general formula

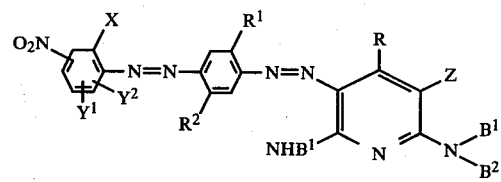

where
X is fluorine, chlorine, bromine, methyl, trifluoromethyl, methoxy, cyano, nitro, methylsulfonyl, ethylsulfonyl, phenylsulfonyl, a carboxylic acid ester group of 2 to 11 carbon atoms, carbamoyl or $C_1$-$C_8$-N-monosubstituted or -N,N-disubstituted carbamoyl or sulfamoyl,
$Y^1$ is hydrogen, chlorine, bromine, nitro, methyl or cyano,
$Y^2$ is hydrogen, chlorine, bromine or methoxy,
Z is cyano or carbamoyl,
R is hydrogen or $C_1$-$C_3$-alkyl,
$R^1$ is hydrogen, methyl, ethyl or $C_1$-$C_4$-alkoxy,
$R^2$ is methyl, ethyl or $C_1$-$C_4$-alkoxy,
the radicals $B^1$ independently or one another are hydrogen or an aliphatic, cycloaliphatic, araliphatic or aromatic radical and
$B^2$ is hydrogen or unsubstituted or substituted alkyl, or
$B^1$ and $B^2$ together with the nitrogen are a saturated 5-membered to 7-membered ring.

The present dyes exhibit excellent fastness properties when utilized in the dyeing and printing of polyester and cotton fabrics as well as polyester/cotton union fabrics.

3 Claims, No Drawings

AZO DYE HAVING A 3-CYANO- OR 3-CARBAMOYL-2,6-DIAMINOPYRIDINE COUPLING COMPONENT

The present invention relates to disazo dyes. According to the invention there are provided compounds of the general formula I

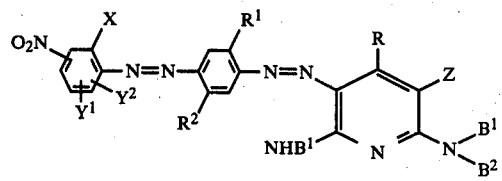

where
X is fluorine, chlorine, bromine, methyl, trifluoromethyl, methoxy, cyano, nitro, methylsulfonyl, ethylsulfonyl, phenylsulfonyl, a carboxylic acid ester group of 2 to 11 carbon atoms, carbamoyl or $C_1$-$C_8$-N-monosubstituted or -N,N-disubstituted carbamoyl or sulfamoyl,
$Y^1$ is hydrogen, chlorine, bromine, nitro, methyl or cyano,
$Y^2$ is hydrogen, chlorine, bromine or methoxy,
Z is cyano or carbamoyl,
R is hydrogen or $C_1$-$C_3$-alkyl,
$R^1$ is hydrogen, methyl, ethyl or $C_1$-$C_4$-alkoxy,
$R^2$ is methyl, ethyl or $C_1$-$C_4$-alkoxy,
the radicals $B^1$ independently of one another are hydrogen or an aliphatic, cycloaliphatic, araliphatic or aromatic radical and
$B^2$ is hydrogen or unsubstituted or substituted alkyl, or $B^1$ and $B^2$ together with the nitrogen are a saturated 5-membered to 7-membered ring.

Specific examples of radicals X, in addition to those already mentioned, are: $COOCH_3$, $COOC_2H_5$, $COOC_3H_7$, $COOC_4H_9$, $COOC_6H_{13}$, $COOC_8H_{17}$,

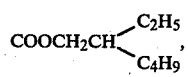

$COOC_{10}H_{21}$, $COOC_2H_4OCH_3$, $COOC_2H_4OC_2H_5$, $COOC_2H_4OC_4H_9$, $COOC_2H_4OC_6H_5$, $COOC_3H_6OH$, $COOC_6H_{12}OH$, $COOC_3H_6$-O-$C_4H_8$-OH, $CONHCH_3$, $CONHC_2H_5$, $CONHC_3H_7$, $CONHC_4H_9$, $CONHC_6H_{13}$,

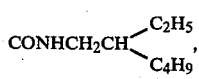

$CONHC_2H_4OH$, $CONHC_2H_4OCH_3$, $CON(CH_3)_2$, $CON(C_2H_5)_2$, $CON(C_3H_7)_2$, $CON(C_4H_9)_2$,

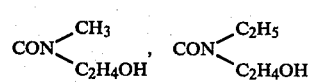

and $CON(C_2H_4$-$OCH_3)_2$.

Examples of substituents $B^1$, other than hydrogen, are alkyl of 1 to 8 carbon atoms, allyl, $C_2$-$C_8$-alkyl substituted by hydroxyl, cyano, alkoxy of 1 to 8 carbon atoms, phenoxy, phenoxyethoxy or benzyloxy, cyclohexyl, norbornyl, benzyl, phenylethyl, phenylhydroxyethyl, phenylpropyl, phenylbutyl, phenyl which is unsubstituted or substituted by chlorine, methyl, trifluoromethyl, pyrrolidonyl, methoxy or ethoxy, $C_5$-$C_{12}$-polyalkoxyalkyl, $C_4$-$C_9$-hydroxypolyalkoxyalkyl, $C_1$-$C_8$-alkanoyloxy-$C_2$-$C_6$-alkyl, $C_7$-$C_{11}$-aroyloxy-$C_2$-$C_6$-alkyl, $C_1$-$C_8$-alkylaminocarbonyloxy-$C_2$-$C_6$-alkyl, $C_6$-$C_{10}$-arylaminocarbonyloxy-$C_2$-$C_6$-alkyl, $C_1$-$C_8$-alkoxycarbonyl-$C_2$-$C_7$-alkyl, $C_1$-$C_{18}$-alkanoyl, $C_8$-$C_{10}$-aralkanoyl, $C_7$-$C_{11}$-aroyl, $C_1$-$C_4$-alkylsulfonyl and $C_6$-$C_{10}$-arylsulfonyl.

Specific examples of radicals $B^1$, in addition to those already mentioned, are:
1. unsubstituted and substituted alkyl:
$CH_3$, $C_2H_5$, n- and i-$C_3H_7$, n- and i-$C_4H_9$, $C_6H_{13}$,

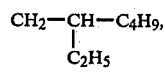

$CH_2CH_2OH$, $(CH_2)_3OH$,

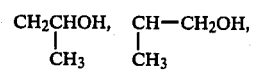

$(CH_2)_4OH$, $(CH_2)_6OH$,

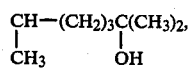

$(CH_2)_2O(CH_2)_2OH$, $(CH_2)_3O(CH_2)_4OH$, $(CH_2)_3O(CH_2)_2OH$, $(CH_2)_2CN$, $(CH_2)_5CN$, $(CH_2)_6CN$, $(CH_2)_7CN$, $(CH_2)_2O(CH_2)_2CN$, $(CH_2)_3O(CH_2)_2CN$, $(CH_2)_2O(CH_2)_2O(CH_2)_2CN$, $(CH_2)_3O(CH_2)_2OCH_3$, $(CH_2)_3O(CH_2)_2OCH_2H_5$, $(CH_2)_3O(CH_2)_6OH$, $(CH_2)_3O(CH_2)_2OCH(CH_3)_2$, $(CH_2)_3O(CH_2)_2OC_4H_9$, $(CH_2)_3O(CH_2)_2OCH_2C_6H_5$, $(CH_2)_3O(CH_2)_2O(CH_2)_2C_6H_5$,

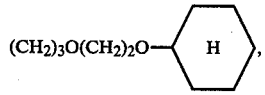

$(CH_2)_3O(CH_2)_2OC_6H_5$,

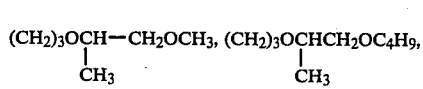

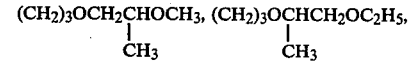

and the corresponding radicals in which the groups $-O(CH_2)_2-$,

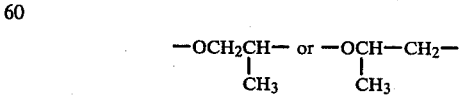

occur two or three times, $CH_2CH_2OCH_3$, $CH_2CH_2OC_2H_5$, $CH_2CH_2OC_3H_7$, $CH_2CH_2OC_4H_9$, $CH_2CH_2OC_6H_5$, $(CH_2)_3OCH_3$, $(CH_2)_3OC_2H_5$, $(CH_2)_3OC_3H_7$, $(CH_2)_3OC_4H_9$, $(CH_2)_3OCH_2CHC_4H_9$, (CH₂)₃OC₆H₁₃, (CH₂)₃OC₈H₁₇, (CH₂)₃OCH₂C₆H₅, (CH₂)₃OC₂H₄C₆H₅, (CH₂)₃OC₆H₅,

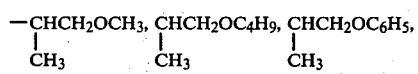

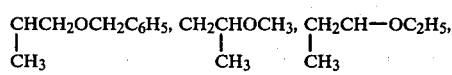

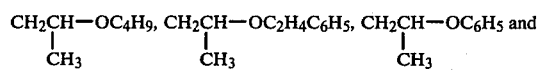

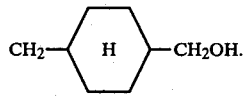

2. unsubstituted and substituted cycloalkyl and polycycloalkyl:

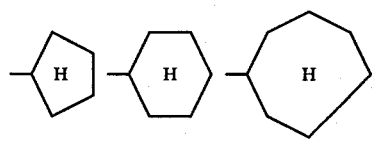

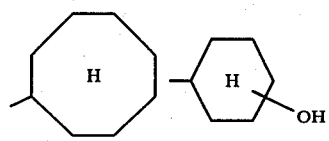

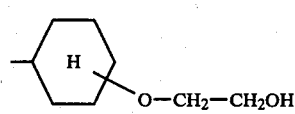

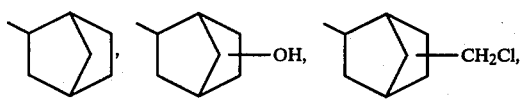

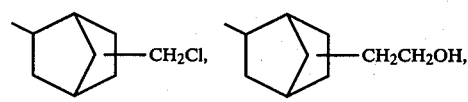

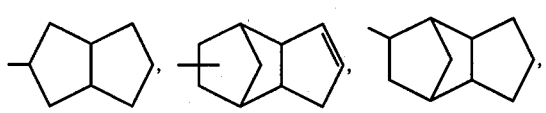

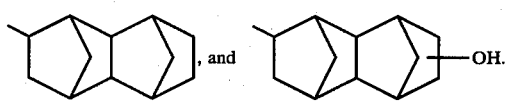

3. Aralkyl:
CH₂C₆H₅, C₂H₄C₆H₅,

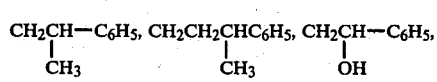

and corresponding radicals with C₆H₄CH₃ in place of C₆H₅.

4. Unsubstituted and substituted phenyl:
C₆H₅, C₆H₄CH₃, C₆H₃(CH₃)₂, C₆H₄OCH₃, C₆H₄OC₂H₅, C₆H₄OCH₂CH₂OH and C₆H₄Cl;

5. the following radicals:
CH₂CH=CH₂, CH₂COOCH₃, (CH₂)₅COOCH₃, (CH₂)₅COOC₂H₅, (CH₂)₅COOC₄H₉,

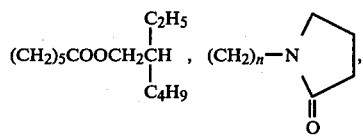

where n is 2, 3, 4 or 6.

6. Acyloxy:
(CH₂)₂OCHO, (CH₂)₂OCOCH₃, (C₂H₄O)₂CHO, (C₂H₄O)₂COCH₃, (CH₂)₂OCOC₃H₇,

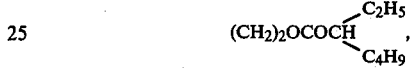

(CH₂)₂OCOC₆H₅, (CH₂)₂OCOC₆H₄CH₃, (CH₂)₂OCOC₆H₄Cl, (CH₂)₂OCOC₁₀H₇, (CH₂)₂OCONHCH₃, (CH₂)₂OCONHC₄H₉,

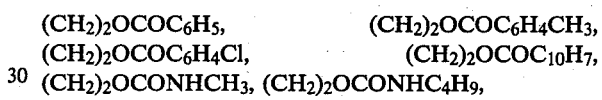

(CH₂)₂OCONHC₆H₅, (CH₂)₂OCONHC₆H₄Cl, (CH₂)₂OCONHC₆H₃Cl₂, and the corresponding radicals which respectively contain (CH₂)₃, (CH₂)₄ or (CH₂)₆ in place of (CH₂)₂.

7. Acyl:
CHO, CH₃CO, C₂H₅CO, C₃H₇CO,

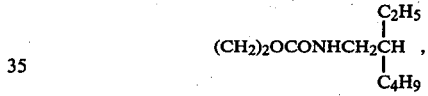

C₂H₅CO, CH₃C₆H₄CO, C₆H₅CH₂CO, C₆H₅OCH₂CO, CH₃SO₂, C₂H₅SO₂, C₆H₅SO₂ and CH₃C₆H₄SO₂.

Examples of preferred substituents are hydrogen, C₂H₅, n- and i-C₃H₇, n- and i-C₄H₉, C₆H₁₃, (CH₂)₆OH,

(CH₂)₃O(CH₂)₂OH, (CH₂)₃O(CH₂)₄OH, (CH₂)₃O(CH₂)₆OH,

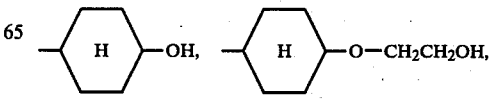

-continued

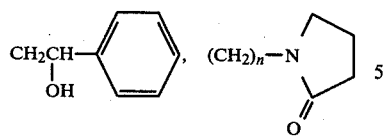

(n=2, 3, 6), CH₂CH₂OCH₃, CH₂CH₂OC₂H₅, CH₂CH₂OC₄H₉, (CH₂)₃OCH₃, (CH₂)₃OC₂H₅, (CH₂)₃OC₃H₇, (CH₂)₃OC₄H₉,

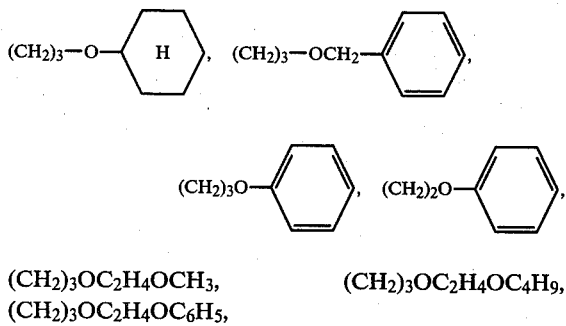

(CH₂)₃OC₂H₄OCH₃, (CH₂)₃OC₂H₄OC₄H₉,
(CH₂)₃OC₂H₄OC₆H₅,

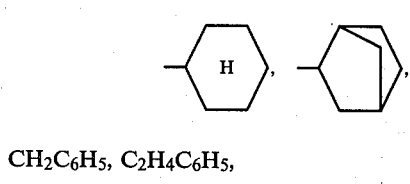

CH₂C₆H₅, C₂H₄C₆H₅,

CH₂CHC₆H₅,
|
CH₃

C₆H₅, C₆H₄CH₃, C₆H₄OCH₃ and C₆H₄OC₂H₄OH and the corresponding radicals with C₆H₄CH₃ in place of C₆H₅.

Examples of radicals

are pyrrolidino, piperidino, morpholino and hexamethyleneimino.

Suitable radicals B² are those mentioned for B¹, provided they conform to the general definition of B².

A compound of the formula I may be prepared by reacting a diazonium compound of an amine of the formula

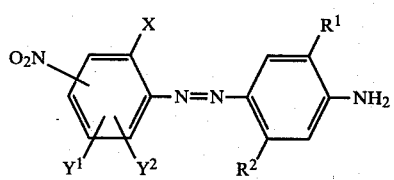

with a coupling component of the formula

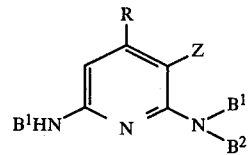

Details of the method of preparation may be found in the Examples, where parts and percentages are by weight, unless stated otherwise.

From the point of view of their structure, the dyes of the formula I may be described as disperse dyes, and such dyes can as a rule not be applied to, for example, cotton. However, German Patent No. 1,811,796 describes a process which permits printing such dyes onto cellulose and cellulose-containing textile material. The general principle of the statements made in the said German Patent regarding the process conditions also apply in the case of the dyes according to the present invention. Further, our British Patent Specification No. 1,539,259 and German Published Patent Application No. 2,528,743 describe other processes by means of which the dyes according to the invention can be applied. Amongst these, printing processes are preferred.

The dyes according to the invention give dyeings and prints with excellent fastness characteristics, amongst which, in particular, the wetfastness and in some cases also the lightfastness should be singled out. In the case of prints there is, for example, no staining of any white ground when washing the dyed fabric. Further, the good match of the hues obtained when dyeing polyester/cotton union fabrics deserves mention.

The navy dyes of the formula I are, in addition, exceptionally suitable for the production of black hues or black mixtures.

Dyes of particular importance are those of the formula II

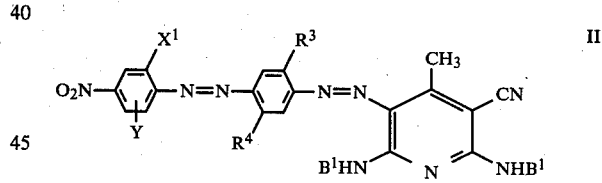

where
$X^1$ is chlorine, bromine, methyl, methoxy, cyano, methylsulfonyl, ethylsulfonyl or phenylsulfonyl,
Y is hydrogen, chlorine or bromine,
$R^3$ is $C_1$–$C_4$-alkoxy,
$R^4$ is methyl or $C_1$–$C_4$-alkoxy and
$B^1$ has the meaning given above for formula I.

Preferred meanings of $B^1$ are, independently of one another, hydrogen, $C_1$–$C_8$-alkyl, allyl and $C_2$–$C_8$-alkyl(-particularly $C_2$ and $C_3$ alkyl) which is substituted by $C_1$–$C_8$-alkoxy, phenoxy, tolyloxy, cyclohexyloxy, benzyloxy, β-phenylethoxy, a carboxylic acid ester group of a total of 2 to 9 carbon atoms, C-acyloxy of a total of 1 to 11 carbon atoms, $C_1$–$C_8$-alkylaminocarbonyloxy, phenylaminocarbonyloxy, tolylaminocarbonyloxy, chlorophenylaminocarbonyloxy, phenylaminocarbonyloxy, tolylaminocarbonyloxy, chlorophenylaminocarbonyloxy, dichlorophenylaminocarbonyloxy or pyrrolidonyl; cyclohexyl, norbornyl, phenyl-$C_1$–$C_4$-alkyl, tolyl-$C_1$–$C_4$-alkyl, β-phenyl-β-hydroxyethyl, phenyl which is unsubstituted or substituted by fluorine, chlorine, bromine, methyl, trifluoromethyl, ethyl, methoxy, ethoxy or pyrrolidonyl, or $(CH_2)_3(OC_2H_4)_nOB$, where n is 1 or 2 and B is $C_1$-$C_4$-alkyl, cyclohexyl, benzyl, phenylethyl, phenyl or tolyl.

In the Examples which follow, only one isomer is referred to in the case of coupling components in which the substituents in the 2- and 6-positions are different from one another; however, it should be noted that the isomer with the 2- and 6-substituents reversed is as a rule also present in the coupling component and hence the corresponding structure is present in the dye.

EXAMPLE 1

0.05 mole of 4'-nitro-2',6'-dichloro-2,5-dimethoxy-4-amino-azobenzene, in the form of the base, is stirred, as an aqueous paste, into 150 parts by volume of 16.5 percent strength hydrochloric acid, containing 2.5 parts of an adduct of sperm oil alcohol and ethylene oxide in the ratio of 1:25, at 40° C. Simultaneously, 15 parts by volume of a 3.33 N sodium nitrite solution are added dropwise, during which addition the reaction temperature rises to 45° C. and the diazonium chloride begins to dissolve. After stirring at ~45° C. for 30 minutes, during which a further 5 parts by volume of a 3.33 N sodium nitrite solution are added dropwise, the warm diazonium salt solution is run into a solution of 14.5 parts of 2,6-bis-methoxyethylamino-3-cyano-4-methyl-pyridine in 350 parts by volume of water and 6 parts by volume of 33 percent strength hydrochloric acid at 20° C. Coupling is complete after only 45 minutes, without further addition of a buffer. The coupling mixture is then brought to pH~11 with 55 parts by volume of 50 percent strength sodium hydroxide solution and the product is filtered off at 60°–65° C. After washing it with hot water, and drying it, a dark blue to black powder of the formula

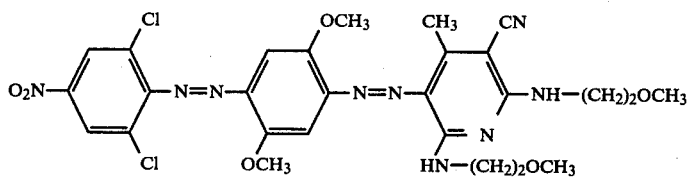

is obtained, which gives a bluish violet solution in N-methylpyrrolidone and dyes or prints polyester and cotton fabrics and polyester/cotton union fabrics in fast navy to black hues.

EXAMPLE 2

0.05 mole of 4'-nitro-2',6'-dichloro-2,5-dimethoxy-4-aminoazobenzene, in the form of the base, is stirred as an aqueous paste into 100 parts by volume of 65 percent strength acetic acid. At the same time, 12 parts of 96 percent strength sulfuric acid and 17.5 parts by volume of 3.33 N aqueous sodium nitrite solution are run in at 15°–20° C. After stirring for from one to two hours at this temperature, the diazonium salt is present in solution and the diazotization is complete, as may be checked by means of a thin layer chromatogram.

The diazonium salt solution thus obtained is now run into a solution, precooled to ~5° C., of 0.052 mole of 2-(3'-methoxy-propylamino)-3-cyano-4-methyl-6-(3'-phenoxyethoxy-propylamino)-pyridine in 200 parts by volume of 90 percent strength acetic acid. Coupling is effected by dropwise addition of 50 parts by volume of saturated sodium acetate solution.

The reaction mixture is then heated to 80° C. and the product is filtered off and washed with warm acetic acid and finally with hot water. After drying, a bluish black powder of the formula

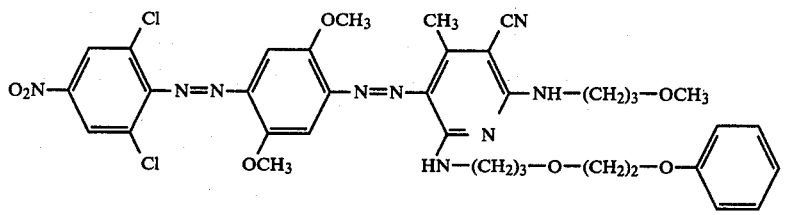

is obtained, which dyes or prints cotton fabrics, polyester fabrics and cotton/polyester union fabrics in fast navy and black hues.

EXAMPLE 3

0.05 mole of 4'-nitro-2',5'-dichloro-2,5-diethoxy-4-amino-azobenzene is stirred, at from 0° to +5° C., into a mixture of 100 parts of 90 percent strength sulfuric acid, 75 parts by volume of 100 percent strength acetic acid and 16 parts of 42 percent strength nitrosylsulfuric acid. On allowing the reaction mixture to come to room temperature, the batch undergoes complete diazotization and the product dissolves.

The resulting diazonium salt solution is run, at ~5° C., into a solution of 0.052 mole of 2,6-bis-(3'-methoxy-propylamino)-3-cyano-4-methyl-pyridine in 500 parts by volume of 90 percent strength acetic acid, to which 100 parts of sodium acetate have been added beforehand. Further addition of 200 parts of sodium acetate, followed by stirring for several hours whilst the mixture comes to room temperature, results in complete coupling. The mixture is then heated to ~80° C. and the dye is filtered off at this temperature. After washing it with hot acetic acid and hot water, and drying it, a bluish black powder of the formula

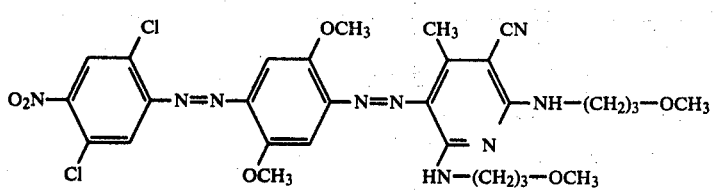

is obtained, which dyes or prints cotton fabrics and polyester fabrics in dark blue hues.

The following dyes, having similar tinctorial properties, are obtained in accordance with the methods of Examples 1 to 3.

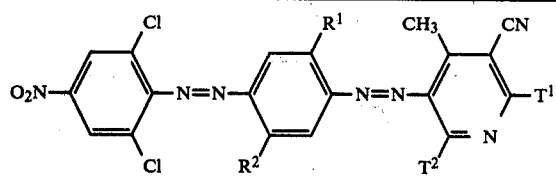

| Example | R$^1$ | R$^2$ | T$^1$ | T$^2$ | Hue |
|---|---|---|---|---|---|
| 4 | OCH$_3$ | OCH$_3$ | NH—(CH$_2$)$_3$—O—(CH$_2$)$_2$—O—C$_6$H$_5$ | NH$_2$ | navy |
| 5 | " | " | NH—(CH$_2$)$_2$—OCH$_3$ | " | " |
| 6 | " | " | NH—(CH$_2$)$_3$—OCH$_3$ | " | " |
| 7 | " | " | NH—(CH$_2$)$_2$—O—(CH$_2$)$_3$—CH$_3$ | " | " |
| 8 | " | " | NH—CH$_2$—CH$_3$ | NH—CH$_2$—CH$_3$ | " |
| 9 | " | " | NH—(CH$_2$)$_3$—CH$_3$ | NH—(CH$_2$)$_3$—CH$_3$ | " |
| 10 | " | " | NH—(CH$_2$)$_2$—OH | NH—(CH$_2$)$_2$—OH | " |
| 11 | " | " | NH—(CH$_2$)$_3$—OH | NH—(CH$_2$)$_3$—OH | " |
| 12 | " | " | NH—(CH$_2$)$_2$—O—(CH$_2$)$_2$—OH | NH—(CH$_2$)$_2$—O—(CH$_2$)$_2$—OH | " |
| 13 | " | " | NH—(CH$_2$)$_2$—O—CH(CH$_3$)$_2$ | NH—(CH$_2$)$_2$—O—CH(CH$_3$)$_2$ | " |
| 14 | " | " | NH—(CH$_2$)$_2$—O—(CH$_2$)$_3$—CH$_3$ | NH—(CH$_2$)$_2$—O—(CH$_2$)$_3$—CH$_3$ | " |
| 15 | " | " | NH—(CH$_2$)$_3$—O—(CH$_2$)$_2$—O—C$_6$H$_5$ | NH—(CH$_2$)$_3$—O—(CH$_2$)$_2$—O—C$_6$H$_5$ | " |
| 16 | " | " | NH—CH$_2$—(tetrahydrofuran-2-yl) | NH—CH$_2$—(tetrahydrofuran-2-yl) | " |
| 17 | " | " | NH—CH$_2$—(4-methyltetrahydropyran-3-yl) | NH—CH$_2$—(4-methyltetrahydropyran-3-yl) | " |
| 18 | " | " | NH—C$_6$H$_5$ | NH—C$_6$H$_5$ | dark blue |
| 19 | " | " | NH—(CH$_2$)$_3$—O—(CH$_2$)$_2$—O—C$_6$H$_5$ | NH—(CH$_2$)$_2$—OCH$_3$ | navy |
| 20 | " | " | NH—(CH$_2$)$_3$—O—(CH$_2$)$_4$—OH | " | " |

-continued

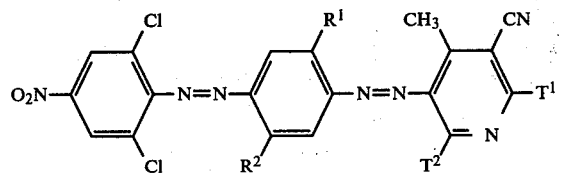

| Example | R¹ | R² | T¹ | T² | Hue |
|---|---|---|---|---|---|
| 21 | " | " | NH—(CH$_2$)$_2$—C$_6$H$_5$ | " | " |
| 22 | " | " | NH—cyclohexyl | " | " |
| 23 | " | " | N[(CH$_2$)$_3$—CH$_3$]$_2$ | " | " |
| 24 | " | " | piperidino | " | " |
| 25 | " | " | morpholino | " | " |
| 26 | " | " | N[(CH$_2$)$_2$—OH]$_2$ | " | " |
| 27 | " | " | N[(CH$_2$)$_2$—OCH$_3$]$_2$ | " | " |
| 28 | " | " | NH—C$_6$H$_5$ | " | " |
| 29 | " | " | NH—C$_6$H$_4$—OC$_2$H$_5$ (4-) | " | " |
| 30 | " | " | NH—C$_6$H$_4$—OCH$_3$ (2-) | " | " |
| 31 | " | " | NH—C$_6$H$_4$—CH$_3$ (3-) | " | " |
| 32 | " | " | NH—(CH$_2$)$_2$—OH | NH—(CH$_2$)$_3$—O—(CH$_2$)$_2$—O—C$_6$H$_5$ | " |
| 33 | " | " | NH—(CH$_2$)$_2$—OCH$_3$ | " | " |
| 34 | O—CH$_2$—CH$_3$ | O—CH$_2$—CH$_3$ | NH—CH$_2$—CH$_3$ | NH—CH$_2$—CH$_3$ | " |
| 35 | " | " | NH—(CH$_2$)$_2$—OCH$_3$ | NH—(CH$_2$)$_2$—OCH$_3$ | " |
| 36 | " | " | NH—(CH$_2$)$_3$—OCH$_3$ | NH—(CH$_2$)$_3$—OCH$_3$ | blue |

-continued

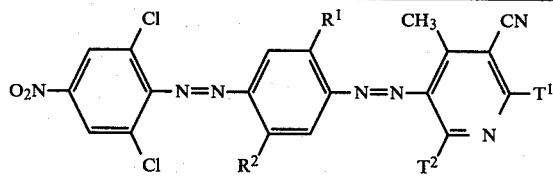

| Example | R¹ | R² | T¹ | T² | Hue |
|---|---|---|---|---|---|
| 37 | " | " | " | NH-(CH₂)₃-O-(CH₂)₂-O-C₆H₅ | navy |
| 38 | O-(CH₂)₃-CH₃ | O-(CH₂)₃-CH₃ | " | NH-(CH₂)₂-OCH₃ | " |
| 39 | " | " | NH-(CH₂)₃-OCH₃ | NH-(CH₂)₃-OCH₃ | " |
| 40 | " | " | NH-(CH₂)₃-O-(CH₂)₂-O-C₆H₅ | NH-(CH₂)₂-OCH₃ | " |
| 41 | " | " | NH-(CH₂)₂-OCH₃ | NH-(CH₂)₃-O-(CH₂)₂-O-C₆H₅ | " |
| 42 | H | OCH₃ | NH-(CH₂)₃-OCH₃ | NH-(CH₂)₃-OCH₃ | deep red |
| 43 | " | " | NH-(CH₂)₃-CH₃ | NH-(CH₂)₃-CH₃ | deep red |
| 44 | " | " | NH-(CH₂)₃-OCH₃ | NH-(CH₂)₃-O-(CH₂)₂-OC₆H₅ | deep red |

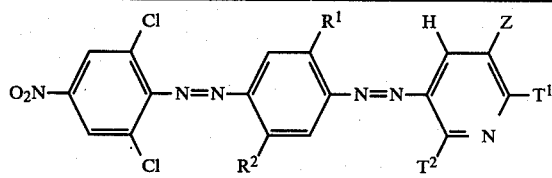

| Example | R¹ | R² | Z | T¹ | T² | Hue |
|---|---|---|---|---|---|---|
| 45 | OCH₃ | OCH₃ | CN | NH-(CH₂)₂-OCH₃ | NH-(CH₂)₂-OCH₃ | navy |
| 46 | " | " | " | NH-(CH₂)₃-OCH₃ | NH-(CH₂)₃-OCH₃ | " |
| 47 | " | " | " | " | NH-(CH₂)₃-O-(CH₂)₂-O-C₆H₅ | " |
| 48 | O(CH₂)₃-CH₃ | O(CH₂)₃-CH₃ | CONH₂ | NH-(CH₂)₂-CH₃ | NH₂ | " |
| 49 | OCH₃ | OCH₃ | " | NH-(CH₂)₂-OCH₃ | NH-(CH₂)₂-OCH₃ | dark blue |
| 50 | O-CH₂-CH₃ | O-CH₂-CH₃ | " | NH-(CH₂)₃-OCH₃ | NH-(CH₂)₃-OCH₃ | " |

| Example | R¹ | R² | R³ | R⁴ | T¹ | T² | Hue |
|---|---|---|---|---|---|---|---|
| 51 | OCH$_3$ | OCH$_3$ | 2—Cl | 5—Cl | —NH—(CH$_2$)$_3$—O—(CH$_2$)$_2$—O—C$_6$H$_5$ | NH$_2$ | dark blue |
| 52 | " | " | " | " | —NH—(CH$_2$)$_3$—O—CH$_3$ | NH—(CH$_2$)$_2$—OCH$_3$ | " |
| 53 | " | " | " | " | " | NH—(CH$_2$)$_3$—OCH$_3$ | greenish blue |
| 54 | " | " | " | " | " | NH—(CH$_2$)$_3$—O—(CH$_2$)$_2$—O—C$_6$H$_5$ | dark blue |
| 55 | " | " | " | " | NH—(CH$_2$)$_3$—O—(CH$_2$)$_2$—O—C$_6$H$_5$ | NH—(CH$_2$)$_3$OCH$_3$ | " |
| 56 | O—CH$_2$—CH$_3$ | O—CH$_2$—CH$_3$ | " | " | NH—(CH$_2$)$_3$—OCH$_3$ | NH—(CH$_2$)$_3$—O—(CH$_2$)$_2$—O—C$_6$H$_5$ | greenish blue |
| 57 | O—(CH$_2$)$_3$—CH$_3$ | O—(CH$_2$)$_3$—CH$_3$ | " | " | NH—(CH$_2$)$_3$—OCH$_3$ | NH—(CH$_2$)$_3$—OCH$_3$ | dark blue |
| 58 | " | " | " | " | NH—(CH$_2$)$_3$—O—(CH$_2$)$_2$—O—C$_6$H$_5$ | NH$_2$ | " |
| 59 | OCH$_3$ | OCH$_3$ | " | 6—Br | NH—(CH$_2$)$_2$—OCH$_3$ | NH—(CH$_2$)$_2$—OCH$_3$ | navy |
| 60 | " | " | " | " | NH—(CH$_2$)$_3$—OCH$_3$ | NH—(CH$_2$)$_3$—OCH$_3$ | dark blue |
| 61 | O—CH$_2$—CH$_3$ | O—CH$_2$—CH$_3$ | " | " | NH—(CH$_2$)$_3$—O—(CH$_2$)$_2$—O—C$_6$H$_5$ | NH$_2$ | navy |
| 62 | " | " | " | " | NH—(CH$_2$)$_2$—OCH$_3$ | NH—(CH$_2$)$_2$—OCH$_3$ | " |
| 63 | " | " | " | " | NH—(CH$_2$)$_3$—OCH$_3$ | NH—(CH$_2$)$_3$—OCH$_3$ | dark blue |
| 64 | " | " | " | " | NH—(CH$_2$)$_3$—OCH$_3$ | NH—(CH$_2$)$_3$—O—(CH$_2$)$_2$—O—C$_6$H$_5$ | navy |
| 65 | CH$_3$ | CH$_3$ | 2—Br | " | NH—(CH$_2$)$_3$—OCH$_3$ | NH—(CH$_2$)$_2$—OCH$_3$ | deep red |
| 66 | OCH$_3$ | OCH$_3$ | " | " | NH—CH$_2$—CH$_3$ | NH—CH$_2$—CH$_3$ | navy |
| 67 | " | " | " | " | NH—(CH$_2$)$_2$—OCH$_3$ | NH—(CH$_2$)$_2$—OCH$_3$ | " |
| 68 | " | " | " | " | NH—(CH$_2$)$_3$—OCH$_3$ | NH—(CH$_2$)$_3$—OCH$_3$ | dark blue |

-continued

[Structure: O₂N-C₆H₃(R³,R⁴)-N=N-C₆H₂(R¹,R²)-N=N-pyridine(H₃C, CN, T¹, T²)]

| Example | R¹ | R² | R³ | R⁴ | T¹ | T² | Hue |
|---|---|---|---|---|---|---|---|
| 69 | O—(CH₂)₃CH₃ | O—(CH₂)₃CH₃ | | | NH—(CH₂)₃—O—(CH₂)₂—OCH₃ | NH₂ | navy |
| 70 | " | " | " | " | NH—(CH₂)₂—OCH₃ | NH—(CH₂)₃—OCH₃ | " |
| 71 | " | " | " | " | NH—(CH₂)₃—OCH₃ | NH—(CH₂)₃—OCH₃ | dark blue |
| 72 | " | " | " | " | NH—(CH₂)₃—CH₃ | NH—(CH₂)₃—CH₃ | " |
| 73 | OCH₃ | OCH₃ | 2—CH₃ | 5—Cl | NH—(CH₂)₃—OCH₃ | NH—(CH₂)₃—O—(CH₂)₂—O—C₆H₅ | " |
| 74 | " | " | " | " | NH—(CH₂)₃—O—(CH₂)₂—O—C₆H₅ | NH—(CH₂)₃—O—(CH₂)₂—O—C₆H₅ | " |
| 75 | " | " | " | " | NH—(CH₂)₃—OCH₃ | NH—(CH₂)₃—OCH₃ | bluish violet |
| 76 | " | " | 2—OCH₃ | 6—Br | NH—(CH₂)₃—O—(CH₂)₂—O—C₆H₅ | NH₂ | " |
| 77 | " | " | " | " | NH—(CH₂)₂—OCH₃ | NH—(CH₂)₂—OCH₃ | dark blue |
| 78 | " | " | " | " | NH—(CH₂)₃—OCH₃ | NH—(CH₂)₃—OCH₃ | " |
| 79 | " | " | " | " | " | NH—(CH₂)₃—O—(CH₂)₂—O—C₆H₅ | " |
| 80 | " | " | 2—Br | 6—CO₂—C₂H₄—O—C₆H₅ | NH—(CH₂)₃—(CH₂)₂—O—C₆H₅ | NH₂ | bluish violet |
| 81 | " | " | " | " | NH—(CH₂)₂—OCH₃ | NH—(CH₂)₂—OCH₃ | navy |
| 82 | " | " | " | " | NH—(CH₂)₃—OCH₃ | NH—(CH₂)₃—OCH₃ | dark blue |
| 83 | " | " | " | " | " | NH—(CH₂)₃—O—(CH₂)₂—O—C₆H₅ | " |
| 84 | " | " | " | 6—CON(CH₂—CH₃)₂ | NH—(CH₂)₃—OCH₃ | NH—(CH₂)₃—OCH₃ | " |

-continued

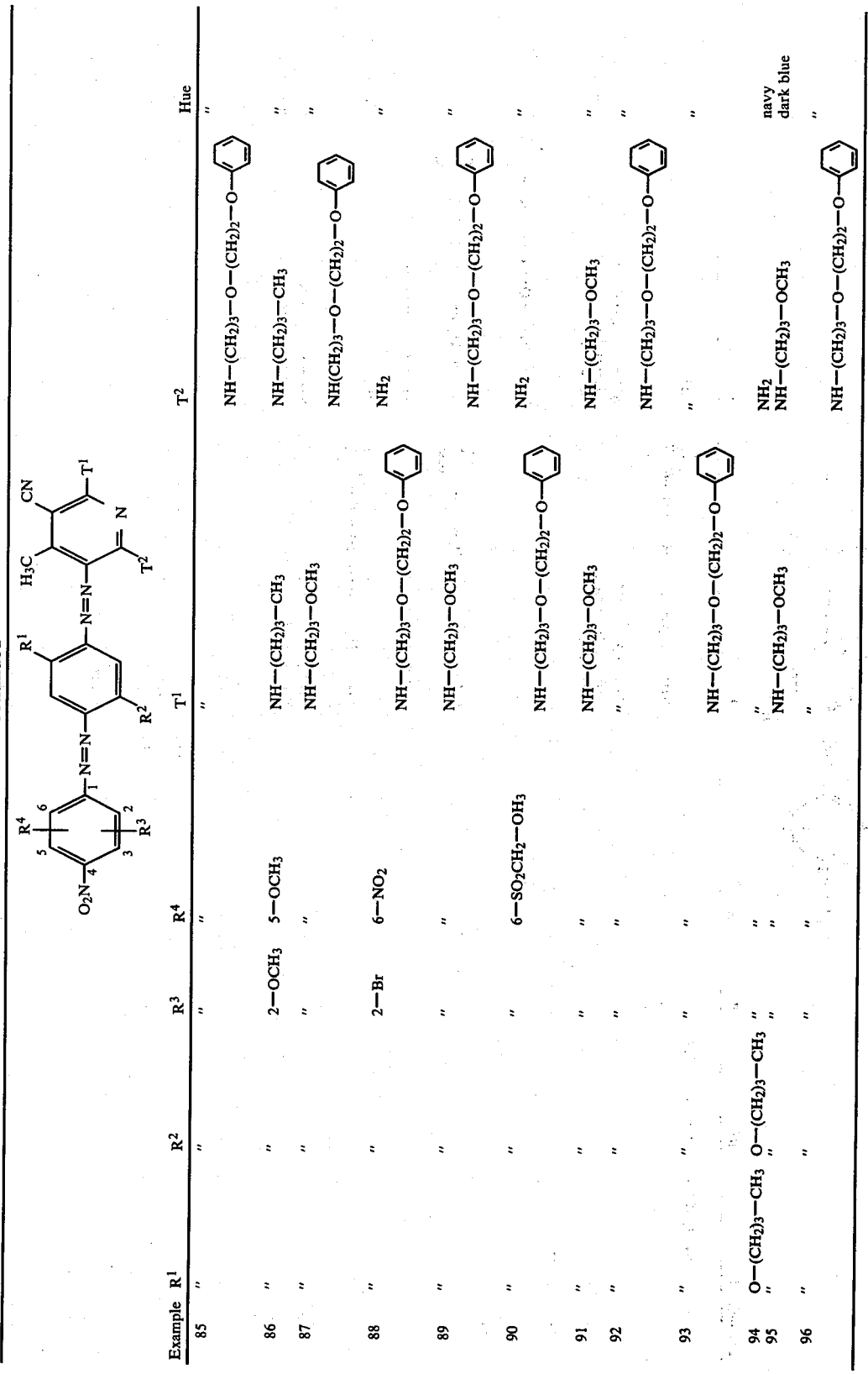

| Example | R¹ | R² | R³ | R⁴ | T¹ | T² | Hue |
|---|---|---|---|---|---|---|---|
| 85 | " | " | " | " | " | NH—(CH₂)₃—O—(CH₂)₂—O—C₆H₅ | " |
| 86 | " | " | 2—OCH₃ | 5—OCH₃ | NH—(CH₂)₃—CH₃ | NH—(CH₂)₃—CH₃ | " |
| 87 | " | " | " | " | NH—(CH₂)₃—OCH₃ | NH(CH₂)₃—O—(CH₂)₂—O—C₆H₅ | " |
| 88 | " | " | 2—Br | 6—NO₂ | NH—(CH₂)₃—O—(CH₂)₂—O—C₆H₅ | NH₂ | " |
| 89 | " | " | " | " | NH—(CH₂)₃—OCH₃ | NH—(CH₂)₃—O—(CH₂)₂—O—C₆H₅ | " |
| 90 | " | " | " | 6—SO₂CH₂—OH₃ | NH—(CH₂)₃—O—(CH₂)₂—O—C₆H₅ | NH₂ | " |
| 91 | " | " | " | " | NH—(CH₂)₃—OCH₃ | NH—(CH₂)₃—OCH₃ | " |
| 92 | " | " | " | " | NH—(CH₂)₃—O—(CH₂)₂—O—C₆H₅ | NH—(CH₂)₃—O—(CH₂)₂—O—C₆H₅ | " |
| 93 | " | " | " | " | " | " | " |
| 94 | O—(CH₂)₃—CH₃ | O—(CH₂)₃—CH₃ | " | " | NH—(CH₂)₃—O—(CH₂)₂—O—C₆H₅ | NH₂ | navy |
| 95 | " | " | " | " | NH—(CH₂)₃—OCH₃ | NH—(CH₂)₃—OCH₃ | dark blue |
| 96 | " | " | " | " | " | NH—(CH₂)₃—O—(CH₂)₂—O—C₆H₅ | " |

| Example | R¹ | R² | R³ | T¹ | T² | Hue |
|---|---|---|---|---|---|---|
| 97 | OCH₃ | OCH₃ | Cl | NH—(CH₂)₃—O—(CH₂)₂—OH | NH₂ | medium blue |
| 98 | " | " | " | NH—(CH₂)₃—O—(CH₂)₄—OH | NH—(CH₂)₂—OCH₃ | " |
| 99 | " | " | " | NH—(CH₂)₂—OH | NH—(CH₂)₃—O—(CH₂)₂—O—C₆H₅ | dark blue |
| 100 | " | " | " | NH—(CH₂)₂—O—OCH₃ | " | medium blue |
| 101 | " | " | " | NH—(CH₂)₃—CH₃ | NH—(CH₂)₃—CH₃ | " |
| 102 | " | " | " | NH—CH₂—(tetrahydrofuranyl) | NH—CH₂—(tetrahydrofuranyl) | " |
| 103 | " | " | " | NH—(CH₂)₂—O—(CH₂)₂—OH | NH—(CH₂)₂—O—(CH₂)₂—OH | dark blue |
| 104 | " | " | " | NH—(CH₂)₂—O—(CH₂)₃—CH₃ | NH—(CH₂)₃—O—(CH₂)₃—CH₃ | " |
| 105 | O—(CH₂)₃—CH₃ | O—(CH₂)₃—CH₃ | " | NH—(CH₂)₃—O—(CH₂)₂—O—C₆H₅ | NH₂ | " |
| 106 | " | " | " | NH—(CH₂)₂—OCH₃ | NH—(CH₂)₂—OCH₃ | " |
| 107 | " | " | " | NH—(CH₂)₃—OCH₃ | NH—(CH₂)₃—OCH | medium blue |
| 108 | " | " | " | NH—(CH₂)₃—CH₃ | NH—(CH₂)₃—CH₃ | " |
| 109 | " | " | " | NH—(CH₂)₃—OCH₃ | NH—(CH₂)₃—O—(CH₂)₂—O—C₆H₅ | " |
| 110 | OCH₃ | OCH₃ | OCH₃ | NH—(CH₂)₃—OCH₃ | NH—(CH₂)₃—OCH₃ | dark blue |

-continued $$\text{O}_2\text{N}-\underset{R^3}{\underset{|}{\bigcirc}}-\text{N}=\text{N}-\underset{R^2}{\underset{|}{\underset{|}{\bigcirc}}}-\text{N}=\text{N}-\underset{\underset{T^2}{|}}{\overset{\overset{H_3C}{|}}{\underset{|}{\bigcirc}}}\overset{CN}{\underset{N}{\bigcirc}}T^1$$

| Example | R¹ | R² | R³ | T¹ | T² | Hue |
|---|---|---|---|---|---|---|
| 111 | " | " | " | " | NH—(CH₂)₃—O—(CH₂)₂—O—⌬ | " |
| 112 | " | " | " | NH—(CH₂)₃—O—(CH₂)₂—O—⌬ | " | " |
| 113 | O—(CH₂)₃—CH₃ | O—(CH₂)₃—CH₃ | " | NH—(CH₂)₂—OCH₃ | NH—(CH₂)₂—OCH₃ | " |
| 114 | " | " | " | NH—(CH₂)₃—OCH₃ | NH—(CH₂)₃—OCH₃ | " |
| 115 | OCH₃ | OCH₃ | CN | NH—(CH₂)₃—O—(CH₂)₂—O—⌬ | NH₂ | " |
| 116 | " | " | " | NH—(CH₂)₃—OCH₃ | NH—(CH₂)₃—OCH₃ | greenish blue |
| 117 | " | " | " | " | " | " |
| 118 | " | " | " | NH—(CH₂)₃—O—(CH₂)₂—O—⌬ | NH—(CH₂)₃—O—(CH₂)₂—O—⌬ | " |
| 119 | O—(CH₂)₃—CH₃ | O—(CH₂)₃—CH₃ | SO₂—CH₂—CH₃ | " | NH₂ | navy |
| 120 | " | " | " | NH—(CH₂)₃—OCH₃ | NH—(CH₂)₃—O—(CH₂)₂—O—⌬ | dark blue |

-continued
| Example | R¹ | R² | R³ | ![structure](R¹, R², R³, T¹, T² on bis-azo pyridine) | T¹ | T² | Hue |
|---|---|---|---|---|---|---|---|
| 121 | " | " | " | | " | NH—(CH₂)₃—O—(CH₂)₂—O— | " |

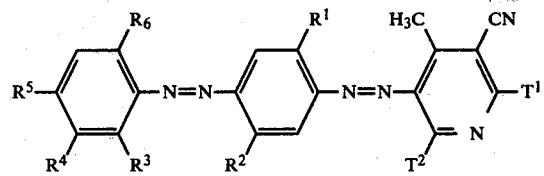

| Example | R¹ | R² | R³ | R⁴ | R⁵ | R⁶ | T¹ | T² | Hue |
|---|---|---|---|---|---|---|---|---|---|
| 122 | OCH₃ | OCH₃ | Br | H | Br | NO₂ | NH-(CH₂)₃O-(CH₂)₂O-⌬ | NH₂ | medium blue |
| 123 | " | " | " | " | " | " | NH—(CH₂)₃—OCH₃ | NH—(CH₂)₃—OCH₃ | " |
| 124 | " | " | " | NO₂ | " | " | NH-(CH₂)₃O-(CH₂)₂O-⌬ | NH₂ | bluish violet |
| 125 | " | " | " | " | " | " | NH—(CH₂)₃—CH₃ | NH—(CH₂)₃—CH₃ | medium blue |
| 126 | " | " | " | " | " | " | NH—(CH₂)₃—OCH₃ | NH—(CH₂)₃—OCH₃ | " |
| 127 | " | " | " | " | " | " | " | NH-(CH₂)₃O-(CH₂)₂O-⌬ | " |
| 128 | " | " | " | OCH₃ | NO₂ | OCH₃ | " | NH—(CH₂)₃—OCH₃ | " |
| 129 | " | " | " | " | " | " | " | NH-(CH₂)₃O-(CH₂)₂O-⌬ | " |

We claim:

1. A dye of the formula:

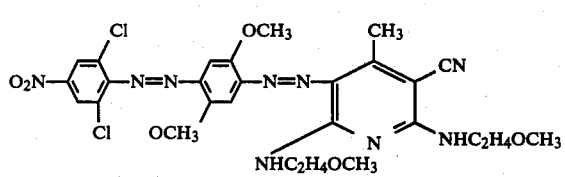

2. A dye of the formula:

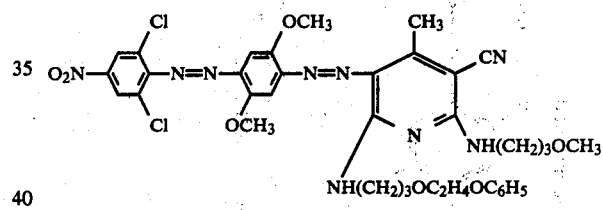

3. A dye of the formula:

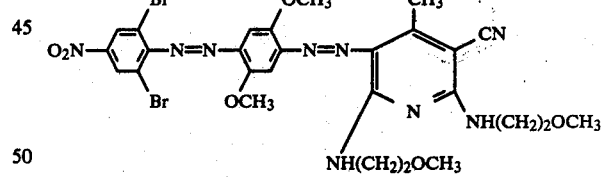

* * * * *